United States Patent
Huang et al.

(10) Patent No.: US 11,372,414 B2
(45) Date of Patent: Jun. 28, 2022

(54) ROBOTIC MOTION CONTROL METHOD AND APPARATUS AND ROBOT USING THE SAME

(71) Applicant: UBTECH ROBOTICS CORP LTD, Shenzhen (CN)

(72) Inventors: Xiangbin Huang, Shenzhen (CN); Musen Zhang, Shenzhen (CN); Wenzhi Xu, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 238 days.

(21) Appl. No.: 16/817,565

(22) Filed: Mar. 12, 2020

(65) Prior Publication Data
US 2021/0200223 A1    Jul. 1, 2021

(30) Foreign Application Priority Data
Dec. 31, 2019   (CN) .......................... 201911413575.5

(51) Int. Cl.
*G05D 1/02*    (2020.01)
(52) U.S. Cl.
CPC ... *G05D 1/0212* (2013.01); *G05D 2201/0207* (2013.01)
(58) Field of Classification Search
CPC .................................................. G05D 1/0212
USPC ........................................................... 701/25
See application file for complete search history.

(56) References Cited

U.S. PATENT DOCUMENTS

| | | | |
|---|---|---|---|
| 10,119,826 B2* | 11/2018 | Di Lorenzo | G06Q 10/047 |
| 10,665,024 B2* | 5/2020 | Holzer | G06K 9/00664 |
| 2007/0046677 A1* | 3/2007 | Hong | G05B 19/41 345/442 |
| 2014/0249674 A1* | 9/2014 | Kodama | B25J 9/1664 700/246 |
| 2020/0110410 A1* | 4/2020 | Murai | G05D 1/0212 |
| 2020/0225673 A1* | 7/2020 | Ebrahimi Afrouzi | G05D 1/0214 |

* cited by examiner

Primary Examiner — Yazan A Soofi

(57) ABSTRACT

A robotic motion control method provided by the present disclosure includes: obtaining a position and orientation of a starting point where the robot is currently located through a positioning sensor, and obtaining a position and orientation of a preset target point where the robot is moved to; determining an arc path and a straight path of the robot according to the position and orientation of the starting point, the position and orientation of the preset target point, and a preset arc radius; and moving the robot to the preset target point according to the determined arc path and straight path. Because there are only pure circular motion and pure linear motion which are simple during the movement of the robot, it is beneficial to improve the precision of the motion control of the robot and enable the robot to reach the target position in a reliable manner.

20 Claims, 8 Drawing Sheets

ROBOTIC MOTION CONTROL METHOD AND APPARATUS AND ROBOT USING THE SAME

CROSS REFERENCE TO RELATED APPLICATIONS

The present disclosure claims priority to Chinese Patent Application No. 201911413575.5, filed Dec. 31, 2019, which is hereby incorporated by reference herein as if set forth in its entirety.

BACKGROUND

1. Technical Field

The present disclosure relates to robot technology, and particularly to a robotic motion control method as well as an apparatus and a robot using the same.

2. Description of Related Art

The outdoor inspection robots generally adopt a four-wheel design. In which, the front wheel of a robot is used for steering while the rear wheel of the robot is connected with a motor to drive the robot.

A robot with an Ackerman wheeled chassis has a coupling relationship between angular velocity and linear velocity, which is more complicated in its control mechanism than other robot with a normal differential chassis, omnidirectional wheeled chassis, or Mecanum wheel chassis. The Ackerman chassis is mainly featured in its large steering radius and the movement from point A to point B cannot be decomposed into a combination of pure rotation and pure linear motion. When controlling the robot to perform short-distance movement, it usually perform real-time control by feedbacking the position information of the robot and the information of a preset target point in real-time, which can meet the requirements for the application scenarios with lower requirements for the position and orientation of the preset target point. In the motion control manners such as automatic recharge control, they have higher requirements for the position and orientation of the preset target point, while the current motion control manners cannot meet the high-precision motion control requirements due to their low precision.

BRIEF DESCRIPTION OF THE DRAWINGS

In order to more clearly illustrate the technical solutions in this embodiment disclosure, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

Figure 1:
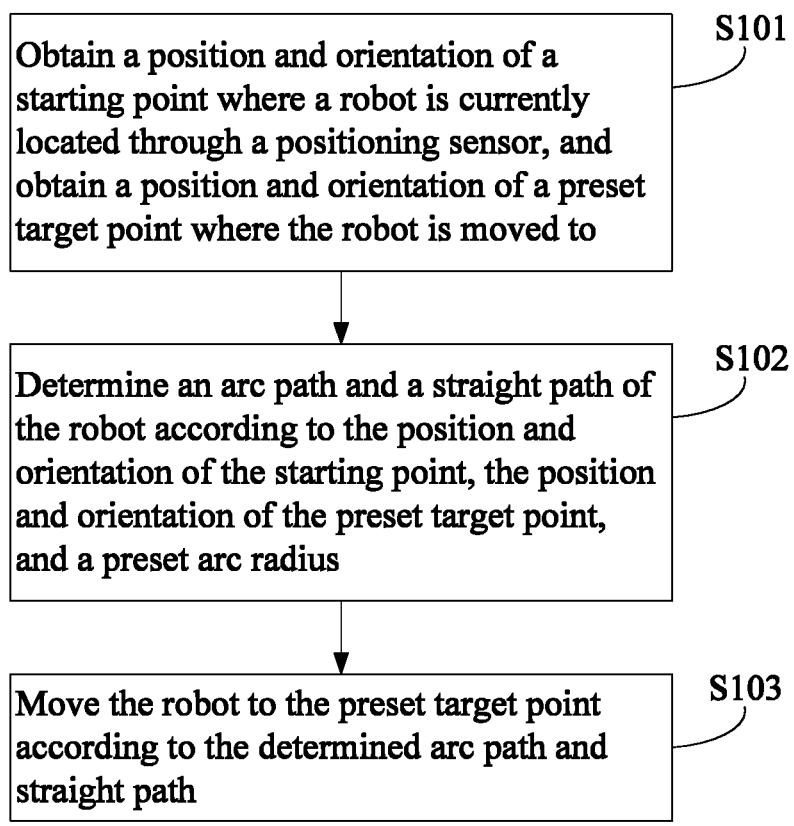
FIG. 1 is a flow chart of an embodiment of a robotic motion control method according to the present disclosure.
Figure 7:
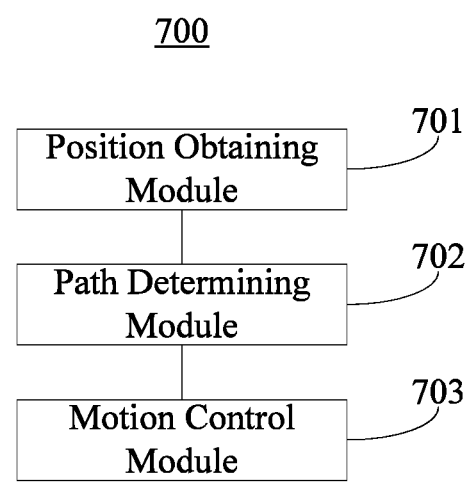
FIG. 7 is a schematic block diagram of an embodiment of a robotic motion control apparatus according to the present disclosure.
Figure 8:
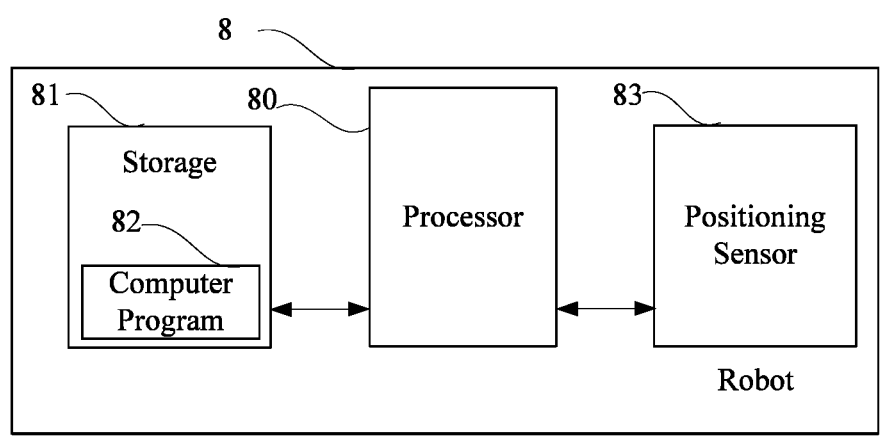
FIG. 8 is a schematic block diagram of an embodiment of a robot according to an embodiment of the present disclosure.

FIG. 1 is a flow chart of an embodiment of a robotic motion control method according to the present disclosure. In this embodiment, a robotic motion control method for a robot is provided. The method is a computer-implemented method executable for a processor, which may be implemented through and applied to a robotic motion control apparatus as shown in FIG. 7 or implemented through a robot as shown in FIG. 8. As shown in FIG. 1, the method includes the following steps.

S101: obtaining a position and orientation of a starting point where the robot is currently located through a positioning sensor, and obtaining a position and orientation of a preset target point where the robot is moved to.

Specifically, the position and orientation of the starting point of the robot can be determined through a positioning system of the robot. For example, the positioning system can include a lidar or a direction sensor (e.g., a gyroscope or a three-axis acceleration sensor) disposed on the robot to determine a current movement direction of the robot, and the detected movement direction can be taken as the current orientation of the robot; and positioning system can include a UWB (ultra wide band) tag or a RFID (radio-frequency identification) tag disposed on the robot to determine the position of the robot. The position and orientation of the preset target point of the robot to be moved to can be determined according to the motion task of the robot. For example, if the motion task of the robot is to move the robot to a charging point for automatically recharging, the position of the preset target point of the robot can be determined according to the position of the charging point, and the orientation of the robot at the preset target point can be determined according to a charging direction of the robot at the charging point.

Figure 2:
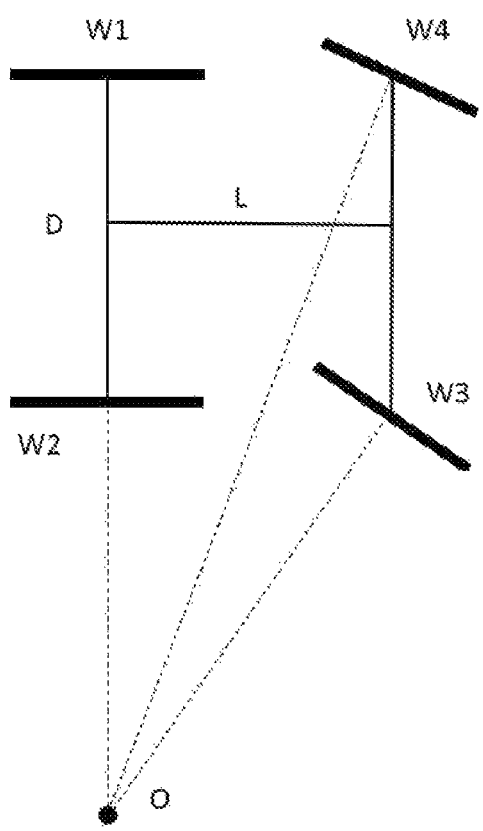
FIG. 2 is a schematic diagram of an example of the steering of a robot chassis according to an embodiment of the present disclosure.

In this embodiment, the robot can be a four-wheeled robot. FIG. 2 is a schematic diagram of an example of the steering of a robot chassis according to an embodiment of the present disclosure. As shown in FIG. 2, the front wheels W1 and W2 of the robot perform the steering control, and a motor drives a differential of the rear wheels W3 and W4 to implement the steering control. The movement of a chassis of the robot can be simplified as a plane movement. When the robot is steered, the axes of the four wheels intersect at one point, where D is the wheel track, L is the wheelbase, and O is the instant center of the robot when steering. The Ackerman wheeled robot has a large steering radius, and its control will be more complicated when the angular velocity and the linear velocity are coupled, which is not conducive to improving the control accuracy of the positioning of the robot. Therefore, in this embodiment, in order to improve the control accuracy, the route of the robot is planned. The route of the robot from the starting point to move to the preset target point is planned as the route only include circular motion and linear motion, thereby effectively improving the motion accuracy of the robot.

S102: determining an arc path and a straight path of the robot according to the position and orientation of the starting point, the position and orientation of the preset target point, and a preset arc radius.

The preset arc radius can be determined according to the rotational speed mechanism of the robot, for example, the Ackerman chassis structure of the robot. The radius range of the steering of the robot can be determined by the rotational speed mechanism, and one or more radiuses can be selected from the steering radius range to control the robot to perform an arc movement from the starting point to the preset target point.

Figure 3:
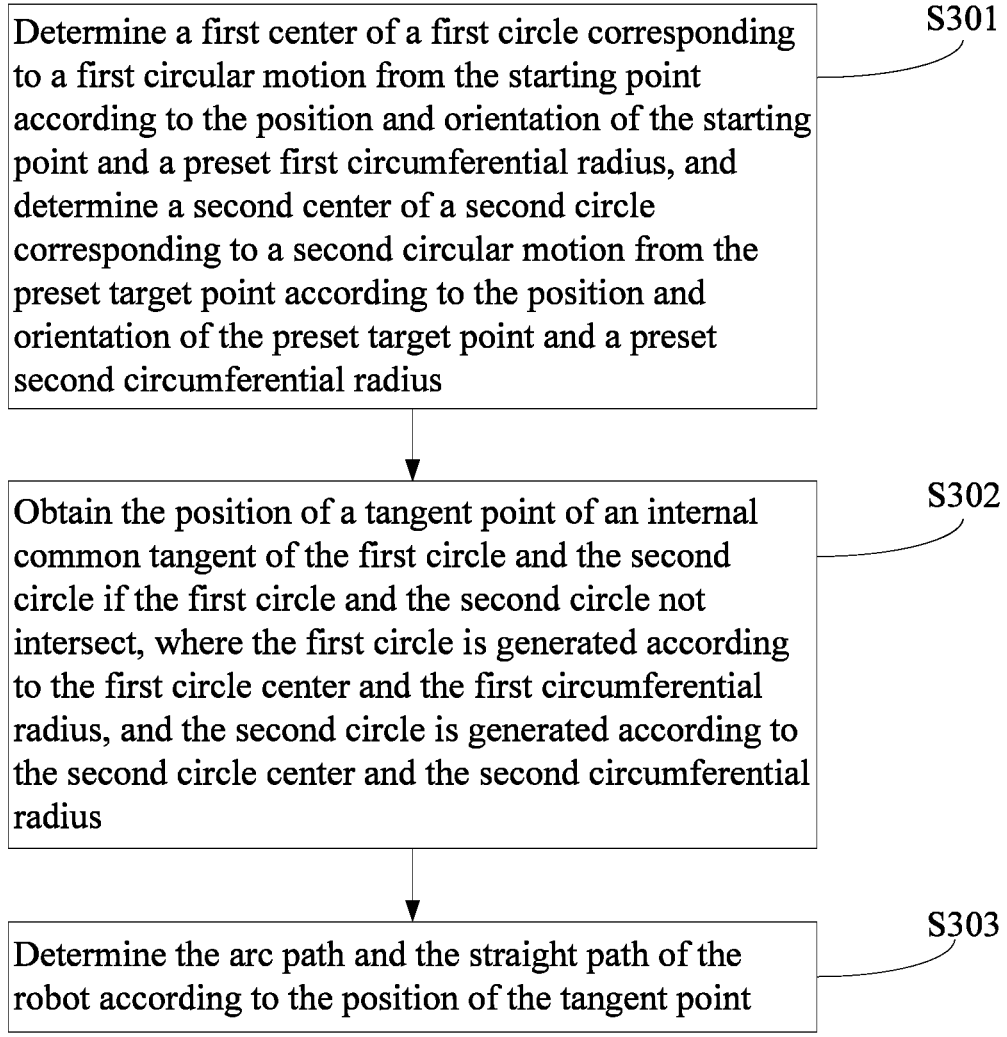
FIG. 3 is a flow chart of an example of determining an arc path and a straight path of a robot according to the present disclosure.

FIG. 3 is a flow chart of an example of determining an arc path and a straight path of a robot according to the present disclosure. As shown in FIG. 3, the steps of determining the arc path and the straight path of the robot may include:

S301: determining a first center of a first circle corresponding to a first circular motion from the starting point according to the position and orientation of the starting point and a preset first circumferential radius, and determining a second center of a second circle corresponding to a second circular motion from the preset target point according to the position and orientation of the preset target point and a preset second circumferential radius.

After determining the position and orientation of the starting point, a vertical line in a second direction that is perpendicular to the orientation can be generated at the position of the starting point according to the orientation of the starting point, and two points can be obtained on the vertical line of the second direction according to the preset first circumferential radius so as to select any one of them as the first center of the first circle.

Similarly, after determining the position and orientation of the preset target point, a vertical line perpendicular to the orientation can be generated at the position of the preset target point according to the orientation of the preset target point, and two points can be obtained on the vertical line according to the preset second circumferential radius so as to select any one of them as the second center of the second circle.

In which, the first circumferential radius and the second circumferential radius can be the same or different.

Since two first circles can be determined at the position of the starting point and two second circles can be determined at the preset target point position, when determining the path from the starting point to the preset target point, any one of the first circles and any one of the second circles can be combined to obtain the shortest path in each combination.

The shortest path of the system can be found according to the plurality of shortest paths generated through the plurality of combinations so as to take as the planned route of the robot.

S302: obtaining the position of a tangent point of an internal common tangent of the first circle and the second circle if the first circle and the second circle not intersect, where the first circle is generated according to the first circle center and the first circumferential radius, and the second circle is generated according to the second circle center and the second circumferential radius.

When the first circle and the second circle do not intersect, the paths from the starting point to the preset target point can be divided into arc paths and straight paths. In order to determine the arc path and the straight path, the position of the intersection of the arc path and the straight path can be determined first, and the intersection of the common tangent and the first circle and the intersection of the common tangent and the second circle can be taken as the intersection of the arc path and the straight path by determining the common tangent of the first circle and the second circle.

Figure 4:
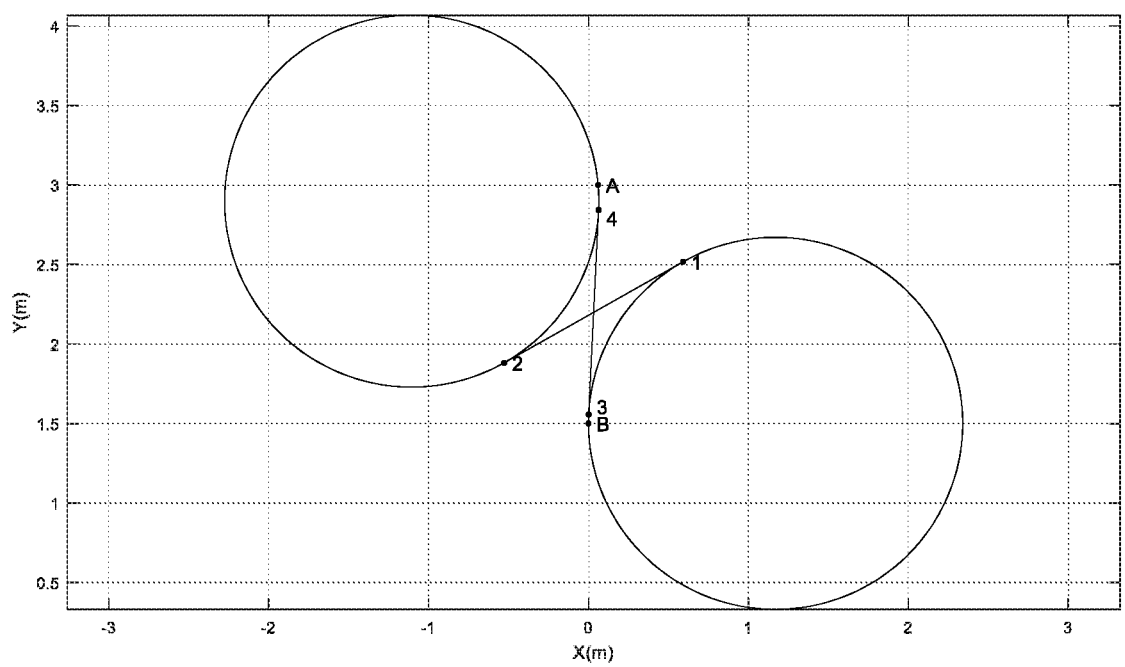
FIG. 4 is a schematic diagram of an example of determining an arc path and a straight path of motion paths of a robot according to an embodiment of the present disclosure.

In which, the first circle is generated according to the first circle center and the first circumferential radius, the second direction at the starting point and perpendicular to the first direction can be obtained according to the obtained first direction corresponding to the orientation of the starting point, and the first circle center of the first circle corresponding to the first circular motion from the starting point is determined at the second direction according to the first circumferential radius. Similarly, the second circle can be determined according to the second circle center and the second circumferential radius. FIG. 4 is a schematic diagram of an example of determining an arc path and a straight path of motion paths of a robot according to an embodiment of the present disclosure. The position of the starting point of the robot is point A on the first circle, and the position of the preset target point of the robot is point B on the second circle. An internal common tangent is made between the first circle and the second circle to obtain tangent points 1, 2, 3, and 4, and the distance of each path can be calculated according to the positions of the tangent points.

In order to determine the position of the tangent point, an equation of the tangent $y=kx+b$ can be generated according to the tangent where the tangent point is located, and joint equations can be obtained by combining with the equation $(x-x_{10})^2+(y-y_{10})^2=r_1^2$ of the tangent point on the first circle and the equation $(x-x_{20})^2+(y-y_{20})^2=r_2^2$ of the tangent point on the second circle as:

$$(kx_{10}-y_{10}+b)^2-r_1^2(k^2+1)=0$$

$$(kx_{20}-y_{20}+b)^2-r_2^2(k^2+1)=0;$$

where, $(x_{10}, y_{10})$ is the center of the first circle, $r_1$ is the radius of the first circle, and $r_2$ is the center of the second circle.

According to the joint equations, if the first circle and the second circle do not intersect, the coordinates of the tangent points of the internal common tangent line on the first circle and the second circle can be determined.

S303: determining the arc path and the straight path of the robot according to the position of the tangent point.

After the position of the tangent point is determined, the distance between any two connected points is determined according to the connection relationship between the starting point, the tangent point, and the preset target point. Based on the determined distance, the distance of any path from the starting point to the preset target point, for example, the distance between the straight path (that is, the path between the tangent points) and the arc path, can be calculated. The path with the shortest distance can be selected as the path between the starting point and the preset target point according to the calculated distance.

Figure 5:
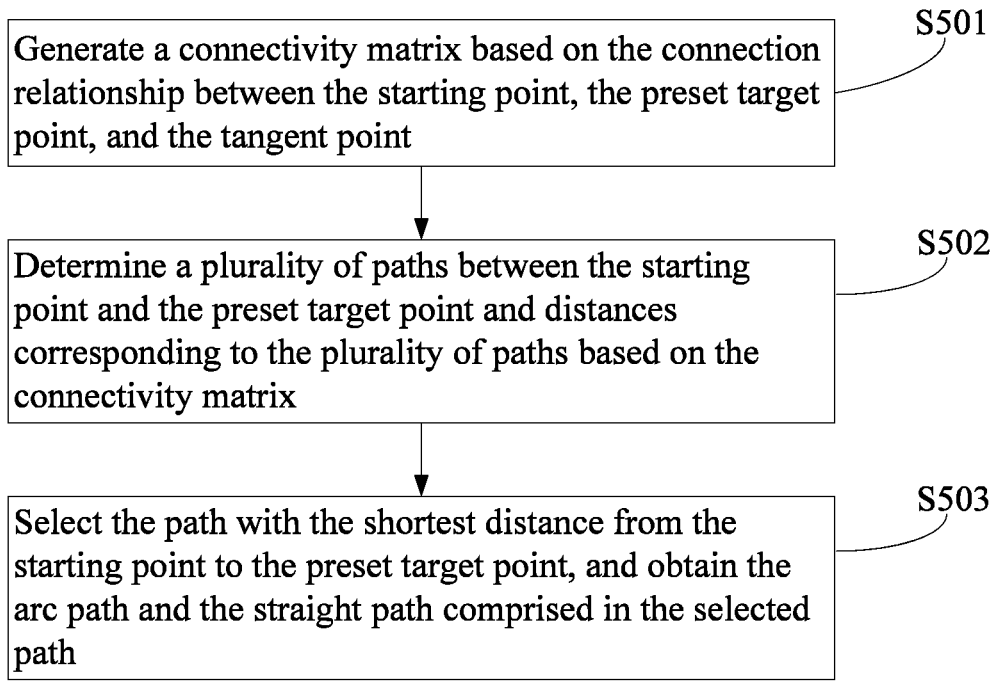
FIG. 5 is flow chart of an example of selecting the path with the shortest distance from the starting point to the preset target point according to the present disclosure.

FIG. 5 is flow chart of an example of selecting the path with the shortest distance from the starting point to the preset target point according to the present disclosure. As shown in FIG. 5, in one embodiment, according to the calculated distance, the step of selecting the path with the shortest distance from the starting point to the preset target point may include:

S501: generating a connectivity matrix based on the connection relationship between the starting point, the preset target point, and the tangent point.

A matrix model can be created based on the amount of connection points. For example, it can determine a total of six points according to the starting point, the prediction target point, and the four tangent points, and the connection relationship of the six points can be determined through the 6×6 adjacency matrix Db, where Dij represents the distance from point i to point j. If there is no distance of connection, 0 is used instead. According to the schematic diagram shown in FIG. 4, the connectivity matrix shown below can be obtained:

$$D = \begin{bmatrix} D_{11} & D_{12} & D_{13} & D_{14} & D_{1A} & D_{1B} \\ D_{21} & D_{22} & D_{23} & D_{24} & D_{2A} & D_{2B} \\ D_{31} & D_{32} & D_{33} & D_{34} & D_{3A} & D_{3B} \\ D_{41} & D_{42} & D_{43} & D_{44} & D_{4A} & D_{4B} \\ D_{A1} & D_{A2} & D_{A3} & D_{A4} & D_{AA} & D_{AB} \\ D_{B1} & D_{B2} & D_{B3} & D_{B4} & D_{BA} & D_{BB} \end{bmatrix}.$$

The distance between any two connected points is determined according to the positions of the tangent point, the starting point, and the preset target point. For two connected points not directly connected, the distance between the two connected points is 0. As shown in FIG. 4, the distance between two points A and B is 0. The distance between points 1 and 4 is 0; the distance between points 1 and A is 0; the distance between points 2 and 3 is 0; the distance between points 2 and B is 0; the distance between points 3 and A is 0; and the distance between points 4 and B is 0. The matrix D can be simplified as:

$$D = \begin{bmatrix} 0 & D_{12} & D_{13} & 0 & 0 & D_{1B} \\ D_{21} & 0 & 0 & D_{24} & D_{2A} & 0 \\ D_{31} & 0 & 0 & D_{34} & & D_{3B} \\ 0 & D_{42} & D_{43} & 0 & D_{4A} & 0 \\ 0 & D_{A2} & & D_{A4} & 0 & 0 \\ D_{B1} & 0 & D_{B3} & 0 & 0 & 0 \end{bmatrix}.$$

S502: determining a plurality of paths between the starting point and the preset target point and distances corresponding to the plurality of paths based on the connectivity matrix.

A plurality of paths from the starting point to the preset target point, for example, the starting point A to the preset target point B shown in FIG. 4, can be determined according to the connection relationship between the connected points. The paths include: A-4-3-B and A-2-1-B. After calculation and comparison, path A-4-3-B is closer than path A-2-1-B. Similarly, the shortest path in the combination of two circles can be obtained according to the other determined first circle or second circle, and the shortest path of the system can be determined according to the shortest path in the plurality of combinations.

S503: selecting the path with the shortest distance from the starting point to the preset target point, and obtaining the arc path and the straight path comprised in the selected path.

According to the calculated shortest path, the arc path and the straight path corresponding to the shortest path can be determined. For example, according to the path A-4-3-B, it can be determined that the included arc paths are A-4 and 3-B, and the included straight path is 4-3.

Figure 6:
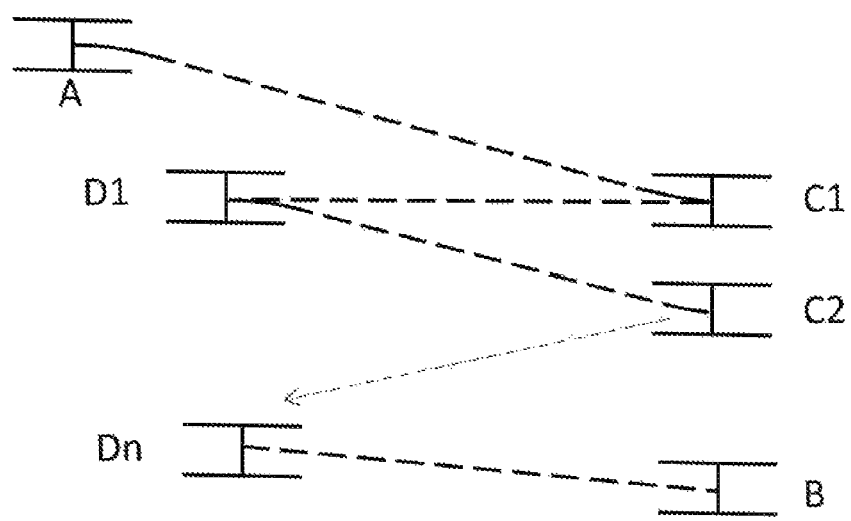
FIG. 6 is a schematic diagram of an example of determining an arc path and a straight path according to a tangent point according to the present disclosure.

In addition, in one embodiment, if the determined first circle intersects the second circle, a motion path generated by the arc path and the straight path can be determined by a gradual adjustment method. FIG. 6 is a schematic diagram of an example of determining an arc path and a straight path according to a tangent point according to the present disclosure. As shown in FIG. 6, for example, a first temporary point C1 that is within a predetermined range of the preset target point and has the same orientation as the preset target point is selected to determines a first temporary circle through the first temporary point C1 and the second circumferential radius, the arc path and the straight path of the robot to move to the first temporary point C1 according to the tangent point of the first circle and the first temporary circle is determined, and the robot is controlled to move to the first temporary point C1.

The robot is moved from the first temporary point C1 to the second temporary point D1 in a predetermined range of the starting point through linear motion, and the second temporary point D1 has the same orientation as the robot at the starting point. If the second temporary circle determined through the second temporary point D1 intersects the second circle, the robot is moved from the second temporary point D1 to the third temporary point C2 within a predetermined range of the preset target point B through the arc path and the straight path, and is moved from the third temporary point C2 to the fourth temporary point D2 within the preset range of the starting point A, until the 2N-th temporary circle determined through the temporary point Dn selected in the 2N-th selection does not intersect with the second circle. Furthermore, the arc path and the straight path can be obtained through the tangent point of the internal common tangent determined through the 2N temporary circle and the second circle, so that the robot reaches the preset target point according to the arc path and the straight path, where 2N is the amount of the selected temporary points.

S103: moving the robot to the preset target point according to the determined arc path and straight path.

According to the determined arc path and the straight path, the robot can be controlled to perform pure circular and linear motions, so that the motion control of the robot can be simpler, and the accuracy of the motion control of the robot can be higher.

FIG. 7 is a schematic block diagram of an embodiment of a robotic motion control apparatus according to the present disclosure. A robotic motion control apparatus 700 for a robot is provided, which corresponds to the robotic motion control method described in the above-mentioned embodiment. As shown in FIG. 7, the robotic motion control apparatus 700 includes:

a position obtaining module 701 configured to obtain a position and orientation of a starting point where the robot is currently located through a positioning sensor, and obtain a position and orientation of a preset target point where the robot is moved to;

a path determining module 702 configured to determine an arc path and a straight path of the robot according to the position and orientation of the starting point, the position and orientation of the preset target point, and a preset arc radius; and a motion control module 703 configured to move the robot to the preset target point according to the determined arc path and straight path.

The robotic motion control apparatus 700 described in FIG. 7 corresponds to the robotic motion control method described in FIG. 1.

In this embodiment, each of the above-mentioned modules/units is implemented in the form of software, which can be computer program(s) stored in a memory of the robotic motion control apparatus 700 and executable on a processor of the robotic motion control apparatus 700. In other embodiments, each of the above-mentioned modules/units may be implemented in the form of hardware (e.g., a circuit of the robotic motion control apparatus 700 which is coupled to the processor of the robotic motion control apparatus 700) or a combination of hardware and software (e.g., a circuit with a single chip microcomputer).

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 8 is a schematic block diagram of an embodiment of a robot according to an embodiment of the present disclosure. A robot 80 is provided, which corresponds to the robotic motion control method described in the above-mentioned embodiment. As shown in FIG. 8, in this embodiment, the robot 8 includes a processor 80, a storage 81, a computer program 82 stored in the storage 81 and executable on the processor 80, for example, a robotic motion control program, and a positioning sensor 83. When executing (instructions in) the computer program 82, the processor 80 implements the steps in the above-mentioned embodiments of the robotic motion control method. Alternatively, when the processor 80 executes the (instructions in) computer program 82, the functions of each module/unit in the above-mentioned apparatus are implemented.

Exemplarily, the computer program 82 may be divided into one or more modules/units, and the one or more modules/units are stored in the storage 81 and executed by the processor 80 to realize the present disclosure. The one or more modules/units may be a series of computer program instruction sections capable of performing a specific function, and the instruction sections are for describing the execution process of the computer program 82 in the robot 8. For example, the computer program 82 can be divided into:

a position obtaining module configured to obtain a position and orientation of a starting point where the robot is currently located through the positioning sensor 83, and obtain a position and orientation of a preset target point where the robot is moved to;

a path determining module configured to determine an arc path and a straight path of the robot according to the position and orientation of the starting point, the position and orientation of the preset target point, and a preset arc radius; and a motion control module configured to move the robot to the preset target point according to the determined arc path and straight path.

The robot 8 may include, but is not limited to, the processor 80 and the storage 81. It can be understood by those skilled in the art that FIG. 8 is merely an example of the robot 8 and does not constitute a limitation on the robot 8, and may include more or fewer components than those shown in the figure, or a combination of some components or different components. For example, the robot 8 may further include an input/output device, a network access device, a bus, and the like.

The processor 80 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 81 may be an internal storage unit of the robot 8, for example, a hard disk or a memory of the robot 8. The storage 81 may also be an external storage device of the robot 8, for example, a plug-in hard disk, a smart media card (SMC), a secure digital (SD) card, flash card, and the like, which is equipped on the robot 8. Furthermore, the storage 81 may further include both an internal storage unit and an external storage device, of the robot 8. The storage 81 is configured to store the computer program 82 and other programs and data required by the robot 8. The storage 81 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of this embodiment disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of this embodiment disclosure, and should be included within the scope of the present disclosure.

What is claimed is:

1. A computer-implemented motion control method for a robot, comprising executing on a processor steps of:
   obtaining a position and orientation of a starting point where the robot is currently located through a positioning sensor, and obtaining a position and orientation of a preset target point where the robot is moved to;
   determining an arc path and a straight path of the robot according to the position and orientation of the starting point, the position and orientation of the preset target point, and a preset arc radius; and
   moving the robot to the preset target point according to the determined arc path and straight path;
   wherein the step of determining the arc path and the straight path of the robot according to the position and orientation of the starting point, the position and orientation of the preset target point, and the preset arc radius comprises:
      determining a first center of a first circle corresponding to a first circular motion from the starting point according to the position and orientation of the starting point and a preset first circumferential radius, and determining a second center of a second circle corresponding to a second circular motion from the preset target point according to the position and orientation of the preset target point and a preset second circumferential radius;
      obtaining the position of a tangent point of an internal common tangent of the first circle and the second circle in response to the first circle and the second circle being not intersecting, wherein the first circle is generated according to the first circle center and the first circumferential radius, and the second circle is generated according to the second circle center and the second circumferential radius; and
      determining the arc path and the straight path of the robot according to the position of the tangent point; and
   wherein the method further comprises:
      selecting a first temporary point within a predetermined range of the preset target point in response to the first circle intersecting the second circle such that the first temporary point and the second circumferential radius determine the first temporary circle;
      determining the arc path and the linear path for the robot to move to the first temporary point according to a tangent point of the first circle and the first temporary circle to control the robot to move to the first temporary point;
      moving the robot from the first temporary point to a second temporary point within a predetermined range of the starting point; and
      moving the robot from the second temporary point to a third temporary point within a predetermined range of the preset target point through the arc path and the straight path, and moving the robot from the third temporary point to a fourth temporary point within a preset range of the starting point through linear motion until the 2N-th temporary circle determined through the 2N-th temporary point selected in the 2N-th selection does not intersect with the second circle, in response to the second temporary circle determined through the second temporary point intersecting the second circle, wherein 2N is the amount of the selected temporary points;

obtaining the arc path and the straight path through the tangent point of the internal common tangent determined through the 2N-th temporary circle and the second circle; and moving the robot to the preset target point according to the arc path and the straight path.

2. The method of claim 1, wherein the step of determining the first center of the first circle corresponding to the first circular motion from the starting point according to the position and orientation of the starting point and the preset first circumferential radius comprises:

obtaining a second direction at the position of the starting point and perpendicular to a first direction according to the first direction corresponding to the obtained orientation of the starting point; and determining the first center of the first circle corresponding to the first circular motion from the position of the starting point at the second direction according to the first circumferential radius.

3. The method of claim 1, wherein the step of obtaining the position of the tangent point of the internal common tangent of the first circle and the second circle comprises:

obtaining the equation of the tangent where the tangent point is located as follows:

$$y=kx+b;$$

obtaining the equations of the first circle and the second circle where the tangent point is located as follows:

$$(x-x_{10})^2+(y-y_{10})^2=r_1^2; \text{ and}$$

$$(x-x_{20})^2+(y-y_{20})^2=r_2^2;$$

where, $(x_{10}, y_{10})$ is the center of the first circle, $r_1$ is the radius of the first circle, and $r_2$ is the center of the second circle;

obtaining joint equations based on the tangent equation, the first circle equation, and the second circle equation as:

$$(kx_{10}-y_{10}+b)^2-r_1^2(k^2+1)=0$$

$$(kx_{20}-y_{20}+b)^2-r_2^2(k^2+1)=0; \text{ and}$$

determining the positions of the tangent points of the internal common tangents of the first circle and the second circle base on the joint equations.

4. The method of claim 1, wherein the step of determining the arc path and the straight path of the robot according to the position of the tangent point comprises:

calculating a distance between any two connected points in a connection relationship of the tangent point, the starting point, and the preset target point; and selecting a path with the shortest distance from the starting point to the preset target point based on the calculated distance, and obtaining the arc path and the straight path comprised in the selected path.

5. The method of claim 4, wherein the step of selecting the path with the shortest distance from the starting point to the preset target point based on the calculated distance, and obtaining the arc path and the straight path comprised in the selected path comprises:

generating a connectivity matrix $$D = \begin{bmatrix} D_{11} & D_{12} & D_{13} & D_{14} & D_{1A} & D_{1B} \\ D_{21} & D_{22} & D_{23} & D_{24} & D_{2A} & D_{2B} \\ D_{31} & D_{32} & D_{33} & D_{34} & D_{3A} & D_{3B} \\ D_{41} & D_{42} & D_{43} & D_{44} & D_{4A} & D_{4B} \\ D_{A1} & D_{A2} & D_{A3} & D_{A4} & D_{AA} & D_{AB} \\ D_{B1} & D_{B2} & D_{B3} & D_{B4} & D_{BA} & D_{BB} \end{bmatrix}$$

based on the connection relationship between the starting point, the preset target point, and the tangent point, where D is the connectivity matrix, A is the starting point, B is the preset target point, 1, 2, 3, 4 represent the internal common tangent point of the first circle and the second circle, and $D_{ij}$ represents a connection distance from the i-th point to the j-th point;

determining a plurality of paths between the starting point A and the preset target point B and distances corresponding to the plurality of paths based on the connectivity matrix; and selecting the path with the shortest distance from the starting point to the preset target point, and obtaining the arc path and the straight path comprised in the selected path.

6. The method of claim 1, wherein the position and orientation of the starting point are determined through a positioning system of the robot.

7. The method of claim 6, wherein the positioning system includes a lidar, a direction sensor, a ultra wide band tag, or a radio-frequency identification tag disposed on the robot.

8. The method of claim 1, wherein the position and orientation of the preset target point are determined according to a motion task of the robot.

9. The method of claim 1, wherein the preset arc radius is determined according to a rotational speed mechanism of the robot.

10. The method of claim 1, wherein the step of determining the first center of the first circle corresponding to the first circular motion from the starting point according to the position and orientation of the starting point and the preset first circumferential radius comprises:

generating a vertical line in a second direction that is perpendicular to the orientation of the starting point at the position of the starting point, according to the orientation of the starting point;

obtaining two points on the generated vertical line according to the preset first circumferential radius; and selecting any one of the obtained two points as the first center of the first circle.

11. A motion control apparatus for a robot, comprising:

a position obtaining module configured to obtain a position and orientation of a starting point where the robot is currently located through a positioning sensor, and obtain a position and orientation of a preset target point where the robot is moved to;

a path determining module configured to determine an arc path and a straight path of the robot according to the position and orientation of the starting point, the position and orientation of the preset target point, and a preset arc radius; and a motion control module configured to move the robot to the preset target point according to the determined arc path and straight path;

wherein the path determining module is further configured to:

determine a first center of a first circle corresponding to a first circular motion from the starting point according to the position and orientation of the starting point and a preset first circumferential radius, and determining a second center of a second circle corresponding to a second circular motion from the preset target point according to the position and orientation of the preset target point and a preset second circumferential radius;

obtain the position of a tangent point of an internal common tangent of the first circle and the second circle in response to the first circle and the second circle being not intersecting, wherein the first circle is generated according to the first circle center and the first circumferential radius, and the second circle is generated according to the second circle center and the second circumferential radius; and determine the arc path and the straight path of the robot according to the position of the tangent point; and wherein the path determining module is further configured to:

obtain the equation of the tangent where the tangent point is located as follows:

$y = kx + b;$ obtain the equations of the first circle and the second circle where the tangent point is located as follows:

$(x - x_{10})^2 + (y - y_{10})^2 = r_1^2;$ and $(x - x_{20})^2 + (y - y_{20})^2 = r_2^2;$ where, $(x_{10}, y_{10})$ is the center of the first circle, $r_1$ is the radius of the first circle, and $r_2$ is the center of the second circle;

obtain joint equations based on the tangent equation, the first circle equation, and the second circle equation as:

$(kx_{10} - y_{10} + b)^2 - r_1^2(k^2 + 1) = 0$ $(kx_{20} - y_{20} + b)^2 - r_2^2(k^2 + 1) = 0;$ and determine the positions of the tangent points of the internal common tangents of the first circle and the second circle base on the joint equations.

12. The apparatus of claim 11, wherein the path determining module is configured to:

obtain a second direction at the position of the starting point and perpendicular to a first direction according to the first direction corresponding to the obtained orientation of the starting point; and determine the first center of the first circle corresponding to the first circular motion from the position of the starting point at the second direction according to the first circumferential radius.

13. The apparatus of claim 11, wherein the path determining module is configured to:

calculate a distance between any two connected points in a connection relationship of the tangent point, the starting point, and the preset target point; and select a path with the shortest distance from the starting point to the preset target point based on the calculated distance, and obtaining the arc path and the straight path comprised in the selected path.

14. The apparatus of claim 13, wherein the path determining module is configured to:

generate a connectivity matrix $$D = \begin{bmatrix} D_{11} & D_{12} & D_{13} & D_{14} & D_{1A} & D_{1B} \\ D_{21} & D_{22} & D_{23} & D_{24} & D_{2A} & D_{2B} \\ D_{31} & D_{32} & D_{33} & D_{34} & D_{3A} & D_{3B} \\ D_{41} & D_{42} & D_{43} & D_{44} & D_{4A} & D_{4B} \\ D_{A1} & D_{A2} & D_{A3} & D_{A4} & D_{AA} & D_{AB} \\ D_{B1} & D_{B2} & D_{B3} & D_{B4} & D_{BA} & D_{BB} \end{bmatrix}$$

based on the connection relationship between the starting point, the preset target point, and the tangent point, where D is the connectivity matrix, A is the starting point, B is the preset target point, 1, 2, 3, 4 represent the internal common tangent point of the first circle and the second circle, and $D_{ij}$ represents a connection distance from the i-th point to the j-th point;

determine a plurality of paths between the starting point A and the preset target point B and distances corresponding to the plurality of paths based on the connectivity matrix; and select the path with the shortest distance from the starting point to the preset target point, and obtaining the arc path and the straight path comprised in the selected path.

15. A robot, comprising:

a memory;

a processor; and one or more computer programs stored in the memory and executable on the processor, wherein the one or more computer programs comprise:

instructions for obtaining a position and orientation of a starting point where the robot is currently located through a positioning sensor, and obtaining a position and orientation of a preset target point where the robot is moved to;

instructions for determining an arc path and a straight path of the robot according to the position and orientation of the starting point, the position and orientation of the preset target point, and a preset arc radius; and instructions for moving the robot to the preset target point according to the determined arc path and straight path;

wherein the instructions for determining the arc path and the straight path of the robot according to the position and orientation of the starting point, the position and orientation of the preset target point, and the preset arc radius comprise:

instructions for determining a first center of a first circle corresponding to a first circular motion from the starting point according to the position and orientation of the starting point and a preset first circumferential radius, and determining a second center of a second circle corresponding to a second circular motion from the preset target point according to the position and orientation of the preset target point and a preset second circumferential radius;

instructions for obtaining the position of a tangent point of an internal common tangent of the first circle and the second circle in response to the first circle and the second circle being not intersecting, wherein the first circle is generated according to the first circle center and the first circumferential radius, and the second circle is generated according to the second circle center and the second circumferential radius; and instructions for determining the arc path and the straight path of the robot according to the position of the tangent point; and wherein the one or more computer programs further comprise:
  instructions for selectin a first temporary point within a predetermined range of the preset target point in response to the first circle intersecting the second circle such that the first temporary point and the second circumferential radius determine the first temporary circle;
  instructions for determining the arc path and the linear path for the robot to move to the first temporary point according to a tangent point of the first circle and the first temporary circle to control the robot to move to the first temporary point;
  instructions for moving the robot from the first temporary point to a second temporary point within a predetermined range of the starting point; and
  instructions for moving the robot from the second temporary point to a third temporary point within a predetermined range of the preset target point through the arc path and the straight path, and moving the robot from the third temporary point to a fourth temporary point within a preset range of the starting point through linear motion until the 2N-th temporary circle determined through the 2N-th temporary point selected in the 2N-th selection does not intersect with the second circle, in response to the second temporary circle determined through the second temporary point intersecting the second circle, wherein 2N is the amount of the selected temporary points;
  instructions for obtaining the arc path and the straight path through the tangent point of the internal common tangent determined through the 2N-th temporary circle and the second circle; and
  instructions for moving the robot to the preset target point according to the arc path and the straight path.

16. The apparatus of claim 11, wherein the path determining module is further configured to:
  select a first temporary point within a predetermined range of the preset target point in response to the first circle intersecting the second circle such that the first temporary point and the second circumferential radius determine the first temporary circle;
  determine the arc path and the linear path for the robot to move to the first temporary point according to a tangent point of the first circle and the first temporary circle to control the robot to move to the first temporary point;
  move the robot from the first temporary point to a second temporary point within a predetermined range of the starting point; and
  move the robot from the second temporary point to a third temporary point within a predetermined range of the preset target point through the arc path and the straight path, and move the robot from the third temporary point to a fourth temporary point within a preset range of the starting point through linear motion until the 2N-th temporary circle determined through the 2N-th temporary point selected in the 2N-th selection does not intersect with the second circle, in response to the second temporary circle determined through the second temporary point intersecting the second circle, wherein 2N is the amount of the selected temporary points; and
  obtain the arc path and the straight path through the tangent point of the internal common tangent determined through the 2N-th temporary circle and the second circle.

17. The robot of claim 15, wherein the instructions for determining the first center of the first circle corresponding to the first circular motion from the starting point according to the position and orientation of the starting point and the preset first circumferential radius comprise:
  instructions for obtaining a second direction at the position of the starting point and perpendicular to a first direction according to the first direction corresponding to the obtained orientation of the starting point; and
  instructions for determining the first center of the first circle corresponding to the first circular motion from the position of the starting point at the second direction according to the first circumferential radius.

18. The robot of claim 15, wherein the instructions for obtaining the position of the tangent point of the internal common tangent of the first circle and the second circle comprise:
  instructions for obtaining the equation of the tangent where the tangent point is located as follows:

$y=kx+b;$ instructions for obtaining the equations of the first circle and the second circle where the tangent point is located as follows:

$(x-x_{10})^2+(y-y_{10})^2=r_1^2;$ and $(x-x_{20})^2+(y-y_{20})^2=r_2^2;$ where, $(x_{10}, y_{10})$ is the center of the first circle, $r_1$ is the radius of the first circle, and $r_2$ is the center of the second circle;
  instructions for obtaining joint equations based on the tangent equation, the first circle equation, and the second circle equation as:

$(kx_{10}-y_{10}+b)^2-r_1^2(k^2+1)=0$ $(kx_{20}-y_{20}+b)^2-r_2^2(k^2+1)=0;$ and instructions for determining the positions of the tangent points of the internal common tangents of the first circle and the second circle base on the joint equations.

19. The robot of claim 15, wherein the instructions for determining the arc path and the straight path of the robot according to the position of the tangent point comprise:
  instructions for calculating a distance between any two connected points in a connection relationship of the tangent point, the starting point, and the preset target point; and
  instructions for selecting a path with the shortest distance from the starting point to the preset target point based on the calculated distance, and obtaining the are path and the straight path comprised in the selected path.

20. The robot of claim 19, wherein the instructions for selecting the path with the shortest distance from the starting point to the preset target point based on the calculated distance, and obtaining the arc path and the straight path comprised in the selected path comprise:
  instructions for generating a connectivity matrix $$D = \begin{bmatrix} D_{11} & D_{12} & D_{13} & D_{14} & D_{1A} & D_{1B} \\ D_{21} & D_{22} & D_{23} & D_{24} & D_{2A} & D_{2B} \\ D_{31} & D_{32} & D_{33} & D_{34} & D_{3A} & D_{3B} \\ D_{41} & D_{42} & D_{43} & D_{44} & D_{4A} & D_{4B} \\ D_{A1} & D_{A2} & D_{A3} & D_{A4} & D_{AA} & D_{AB} \\ D_{B1} & D_{B2} & D_{B3} & D_{B4} & D_{BA} & D_{BB} \end{bmatrix}$$

based on the connection relationship between the starting point, the preset target point, and the tangent point, where D is the connectivity matrix, A is the starting point, B is the preset target point, 1, 2, 3, 4 represent the internal common tangent point of the first circle and the second circle, and $D_{ij}$ represents a connection distance from the i-th point to the j-th point;

instructions for determining a plurality of paths between the starting point A and the preset target point B and distances corresponding to the plurality of paths based on the connectivity matrix; and instructions for selecting the path with the shortest distance from the starting point to the preset target point, and obtaining the arc path and the straight path comprised in the selected path.

* * * * *